(12) United States Patent
Chikami

(10) Patent No.: US 7,835,016 B2
(45) Date of Patent: Nov. 16, 2010

(54) POSITIONING DETECTING DEVICE AND ELECTRONIC DEVICE USING THE SAME

(75) Inventor: Mototaka Chikami, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/188,094

(22) Filed: Aug. 7, 2008

(65) Prior Publication Data

US 2009/0046302 A1   Feb. 19, 2009

(30) Foreign Application Priority Data

Aug. 13, 2007   (JP) .............................. 2007-210809

(51) Int. Cl.
*G01B 11/14*   (2006.01)
(52) U.S. Cl. ....................... 356/614; 356/600; 356/640; 396/52; 396/58
(58) Field of Classification Search ......... 356/600–640; 396/52–58
See application file for complete search history.

(56) References Cited

U.S. PATENT DOCUMENTS 7,375,908 B2 * 5/2008 Takahashi ................... 359/819

2008/0085108 A1 * 4/2008 Sekino et al. ................. 396/55

FOREIGN PATENT DOCUMENTS

JP   2005-333181   12/2005

* cited by examiner

*Primary Examiner*—Gregory J Toatley, Jr.
*Assistant Examiner*—Iyabo S Alli
(74) *Attorney, Agent, or Firm*—Cohen Pontani, Lieberman & Pavane LLP

(57) ABSTRACT

A position detecting device, including: a movable section which has an axial section and moves in a direction of an axial line of the axial section; and a supporting section which supports the movable section and allows the movable section to move through the axial section; wherein the movable section includes a basic position section which is arranged on a virtual surface which includes the axial line of the axial section, and the virtual surface is vertically positioned on the supporting section toward the axial section, wherein the supporting section includes a position detecting section to detect a positional change of the basic position section; and wherein the position detecting device detects the position of the movable section relative to the supporting section, based on the change of position of the basic position section, detected by the position detecting section.

5 Claims, 4 Drawing Sheets

FIG. 3 (a)
FIG. 3 (b)
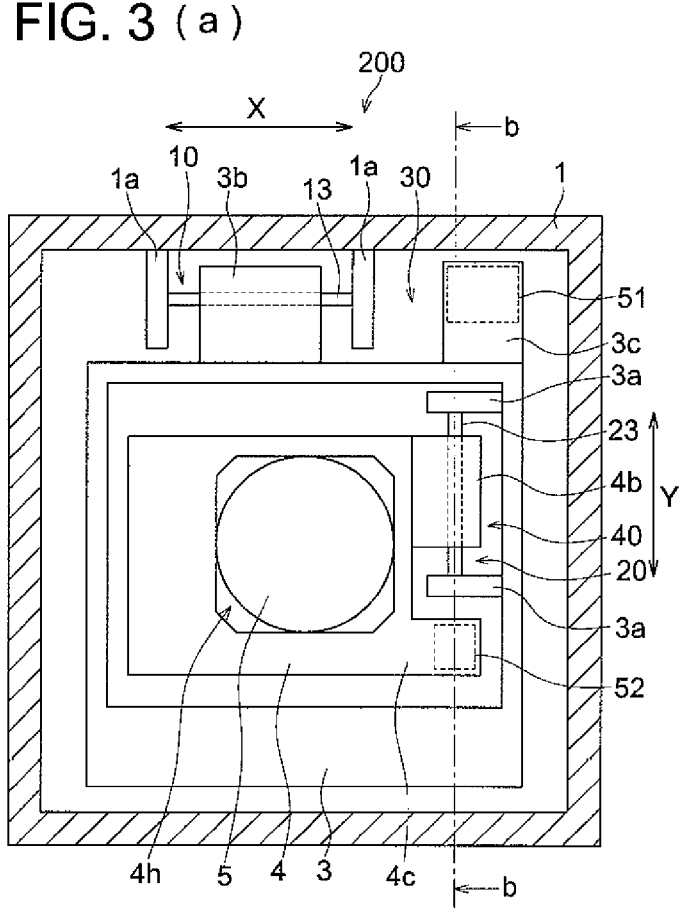
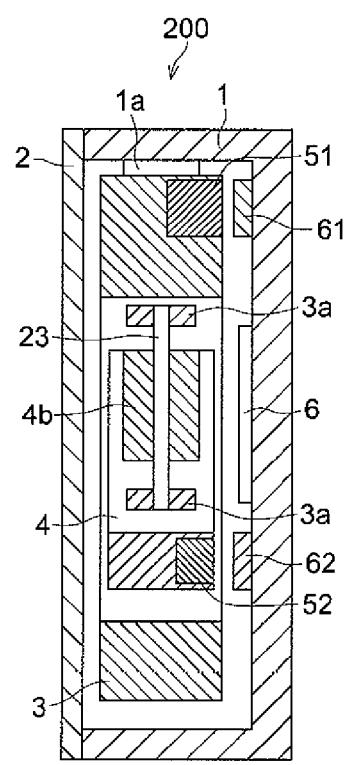

POSITIONING DETECTING DEVICE AND ELECTRONIC DEVICE USING THE SAME

CROSS REFERENCE TO RELATED APPLICATION

This application is based on Japanese Patent Application No. JP2007-210,809 filed on Aug. 13, 2007, with the Japanese Patent Office, the entire content of which is hereby incorporated by reference.

TECHNICAL FIELD

The present invention relates to a position detecting device and an electronic device using the same.

BACKGROUND OF THE INVENTION

In recent years, various imaging devices employ a camera-shake correcting device which counters camera shake by relatively moving an imaging element during image capture and an optical member to guide the image of a subject to said imaging element. Unexamined Japanese Patent Application Publication No. 2005-333,181 discloses a camera shake correcting device, in which the amount of displacement generated by the relative movement of the imaging element and the optical member is detected by a position detecting mechanism including a magnet and a magnet detector.

However, in the above Patent Document, a sensor unit to detect the amount of displacement of the imaging element and the optical member is mounted at a position separated in the direction crossing a direction of relative movement of the imaging element and the optical member, accordingly adverse errors are included in the amount of displacement detected by said position detecting mechanism.

In detail, when the amount of displacement of the imaging element and the optical member is to be detected between the position where the imaging element engages the optical member, and the position which separates in the direction crossing the direction of the relative movement of the imaging element and the optical members, back-lash and distortion are adversely generated between the engaging position and the sensor unit. Accordingly, the errors are included in the detected amount of displacement, whereby the more the engaging position of the imaging element and the optical member are separated from the sensor unit, the greater are the errors included in the detected amount of displacement.

SUMMARY OF THE INVENTION

An object of the present invention is to provide a position detecting device and an electronic device using the same, in which the position of a predetermined object is more accurately detected.

To attain the above object, a position detecting device includes: a movable section which has an axial section and moves in a direction of an axial line of the axial section; and a supporting section which supports the movable section and allows the movable section to move through the axial section; wherein the movable section includes a basic position section which is arranged on a virtual surface which includes the axial line of the axial section, and the virtual surface is vertically positioned on the supporting section toward the axial section, wherein the supporting section includes a position detecting section to detect a positional change of the basic position section; and wherein the position detecting device detects the position of the movable section relative to the supporting section, based on the change of position of the basic position section, detected by the position detecting section.

BRIEF DESCRIPTION OF THE DRAWINGS

FIG. 1(a) is a front view of a cellular phone, while
FIG. 1(b) is a rear view of the cellular phone.
FIG. 3(a) is a cross sectional view at line a-a of the camera unit of FIG. 2, while
FIG. 3(b) is a cross sectional view at line b-b of the camera unit of FIG. 3(a).

DETAILED DESCRIPTION OF THE PREFERRED EMBODIMENT

Figure 1:
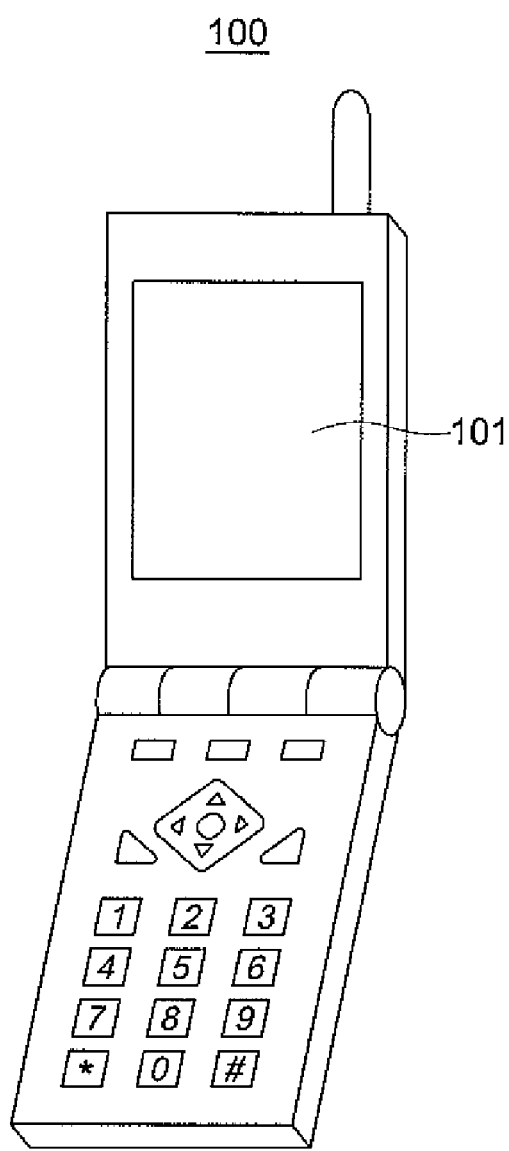
Figure 1:
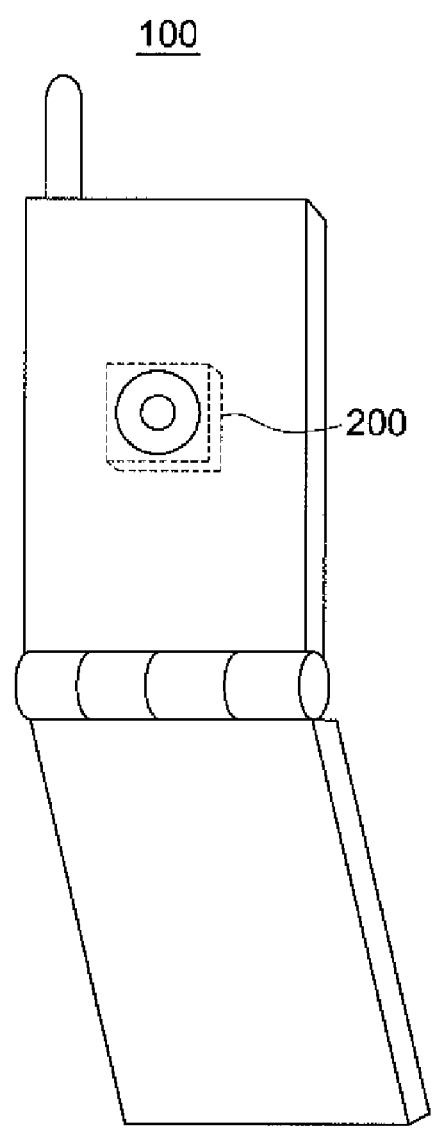

Embodiments of the position detecting device relating to the present invention, and the electronic device using the same position detecting device will now be detailed, while referring to the drawings. In the present embodiments, a cellular phone is used as the electronic device for the explanations. However, the scope of the invention is not be limited to the embodiments shown in these drawings.

Cellular phone 100, including camera unit 200 serving as an imaging unit shown in FIGS. 1(a) and 1(b), is a telephone equipment incorporating a function to digitally capture images of the subject.

Camera unit 200 is mounted at a rear area of said cellular phone 100. The user makes camera unit 200 to face the subject, so that the user can view the image of the subject, to be captured by camera unit 200, on liquid crystal display 101 mounted on the front surface of cellular phone 100. The user checks the displayed image of the subject, and captures the image of the desired subject.

Figure 2:
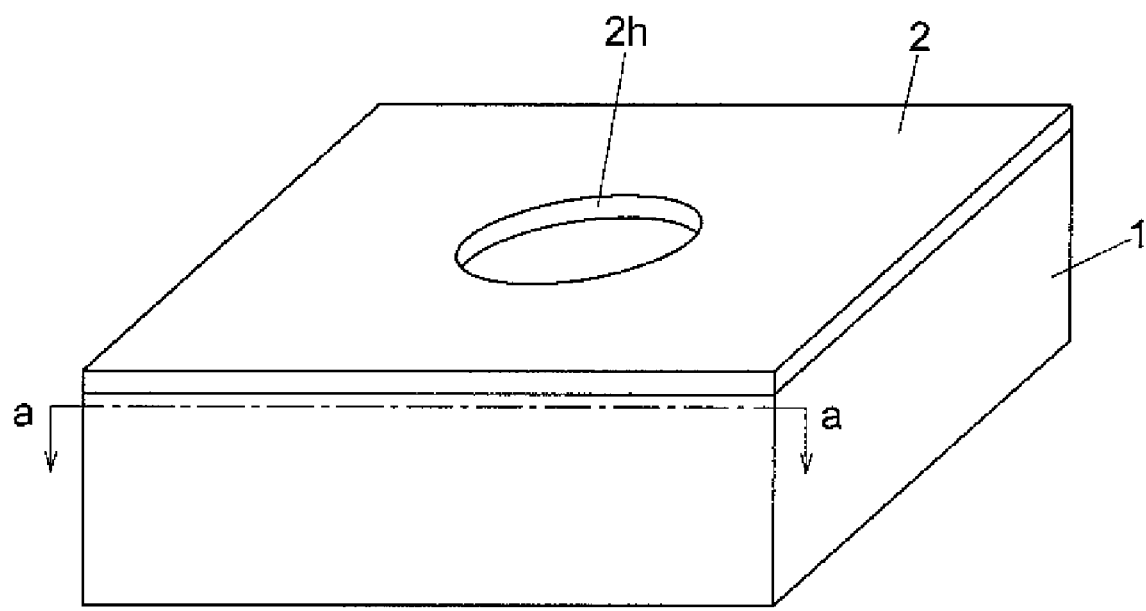
FIG. 2 is a perspective view of a camera unit.

Camera unit 200 shown in FIG. 2 and FIGS. 3(a) and 3(b) is structured to be a box including frame 1 being a basic box shape, and cover plate 2 to cover an upper opening of said frame 1. Said box is hollow to accommodate lens 5, serving as an optical element, a moving mechanism to move lens 5, and related mechanisms.

In addition, at the center of the bottom plate of frame 1, imaging element 6 is included, which includes a CCD (Charge Coupled Device), a CMOS (Complementary Metal-Oxide Semiconductor), and other electronic components. At the center of cover 2, opening 2h (see FIG. 2) is formed to face lens 5 and imaging element 6.

Further, in FIGS. 3(a) and 3(b), camera unit 200 includes: frame 1 serving as a supporting section, cover 2 to enclose frame 1, moving frame 3 connected to frame 1 through first driving device 10, lens frame 4 connected to moving frame 3 through second driving device 20, and lens 5 mounted on lens frame 4.

Frame 1 is a case formed of a resin, and accommodates imaging element 6 at interior bottom. The upper opening to place cover 2 is prepared above imaging element 6.

Further, frame 1 includes paired shaft supporting sections 1a, and 1a, which are provided on an inner side surface of frame 1, and placed parallel to the bottom of frame 1. Said paired shaft supporting sections 1a and 1a are fixed to frame 1 to be vertical on a side surface of frame 1. Said paired shaft supporting sections 1a and 1a have a through-hole to receive after mentioned driving shaft 13.

Cover 2 is a resin molded cover, to enclose the upper opening of frame 1.

First driving device 10 includes SIDM (Smooth Impact Drive Mechanism, being a registered trademark) and first slider section 3b. Said SIDM is structured of an electromechanical transducer element, which is not illustrated, and driving shaft 13. Said first slider section 3b serves as an engaging section to slide on driving shaft 13. Said electromechanical transducer element is an element, such as a piezoelectric element, which changes its volume based on the amount of applied voltage.

SIDM is an actuator which reciprocates driving shaft 13 mounted on the piezoelectric element which changes its volume based on the amount of applied voltage.

The structure of SIDM used in the present invention is the same as the well-known conventional one, so that the structure is not detailed in this specification.

Driving shaft 13 is formed of a carbon resin, an epoxy resin, or the like. Driving shaft 13 reciprocates in its axial direction, based on the expansion and contraction movement of the piezoelectric element of SIDM. Driving shaft 13 is inserted into the through holes of paired shaft supporting sections 1a and 1a.

First slider section 3b is united to moving frame 3 so as to protrude from moving frame 3.

Said first slider section 3b engages driving shaft 13 with a friction force, whereby said first slider section 3b can move in the axial direction of driving shaft 13, based on the expansion and contraction movement of the piezoelectric element of SIDM.

On first driving device 10, when the piezoelectric element of SIDM is slowly expanded or contracted, driving shaft 13 also moves slowly (the reciprocating motion), so that first slider section 3b, engaging driving shaft 13 with proper friction force, can move with driving shaft 13 by said proper friction force in the axial direction of driving shaft 13.

On the other hand, when the piezoelectric element of SIDM is rapidly expanded or contracted, driving shaft 13 also moves rapidly (reciprocating motion), so that first slider section 3b, engaging driving shaft 13 with proper friction force, slides due to its inertia, and becomes stationary while staying at nearly the same position.

In addition, the operation of the SIDM used in the present invention is the same as the well-known conventional one, so that its operation is not detailed in this specification.

Moving frame 3 is a framing box formed of four surfaces, being rectangular, and said moving frame 3 includes first slider section 3b protruding from one of the surfaces of moving frame 3, ejector member 3c protruding in the same direction as first slider section 3b, and paired shaft supporting sections 3a and 3a formed to face inwardly, and protruding from a surface adjoining the surface from which first slider section 3b protrudes.

A through hole is formed in paired shaft supporting sections 3a and 3a, through which driving shaft 23 is inserted, which will be detailed later.

Magnet 51 is mounted on a lower surface of ejector member 3c of moving frame 3.

Magnet sensor 61 is mounted on a bottom surface of frame 1 to face magnet 51.

Moving frame 3 is driven by first driving device 10, in the axial direction of driving shaft 13 (being direction X).

Lens frame 4 has center hole 4h to mount lens 5. Further, lens frame 4 includes second slider section 4b protruding from an outer surface of lens frame 4 toward paired shaft supporting sections 3a and 3a of moving frame 3, and ejector member 4c protruding in the same direction as second slider section 4b.

Magnet 51 is mounted on a lower surface of ejector member 4c of lens frame 4.

Magnet sensor 62 is mounted on a bottom surface of frame 1 to face magnet 52.

Lens frame 4 is driven by second driving device 20, in the axial direction of driving shaft 23 (being direction Y), which will be detailed later.

Second driving device 20 includes SIDM (Smooth Impact Drive Mechanism, being a registered trademark), and first slider section 4b. Said SIDM is structured of an electromechanical transducer element, which is not illustrated, and of driving shaft 23. Said second slider section 4b serves as an engaging section to slide on driving shaft 23. Said electromechanical transducer element is an element, such as a piezoelectric element, which changes its volume based on the amount of applied voltage.

SIDM is an actuator which reciprocates driving shaft 13 mounted on the piezoelectric element which changes its volume based on the amount of applied voltage.

The structure of SIDM used in the present invention is the same as the well-known conventional one, so that its structure is not detailed in this specification.

Driving shaft 23 is formed of a carbon resin, an epoxy resin or the like, and driving shaft 13 reciprocates in its axial direction, based on the expansion and contraction movement of the piezoelectric element of SIDM. Driving shaft 13 is inserted into the through holes of paired shaft supporting sections 3a and 3a.

Second slider section 4b is united to lens frame 4 so as to protrude from lens frame 4.

Said second slider section 4b engages driving shaft 23 with the friction force, so that said second slider section 4b can move in the axial direction of driving shaft 23, based on the expansion and contraction movement of the piezoelectric element of SIDM.

On second driving device 20, when the piezoelectric element of SIDM is slowly expanded or contracted, driving shaft 23 also moves slowly (in the reciprocating motion), so that second slider section 4b, engaging driving shaft 23 with proper friction force, can move with driving shaft 23 by said proper friction force in the axial direction of driving shaft 23.

On the other hand, when the piezoelectric element of SIDM is rapidly expanded or contracted, driving shaft 23 also moves rapidly (in the reciprocating motion), so that second slider section 4b, engaging driving shaft 23 with proper friction force, slides due to its inertia, and becomes stationary while staying at nearly the same position.

In addition, the operation of SIDM used in the present invention is the same as the well-known conventional one, so that the operation is not detailed in this specification.

On camera unit 200, having the structure described above, first driving device 10 mounted on frame 1 allows first slider section 3b to slidably move in direction X. Accordingly, lens frame 4 is moved in direction X through moving frame 3 by the movement of first slider section 3b in direction X, whereby lens 5 is moved in direction X, and then the position of lens 5 can be adjusted.

Further, second driving device 20 mounted on moving frame 3 allows second slider section 4b to move in direction Y, being perpendicular to direction X. Accordingly, lens frame 4 is moved in direction X through moving frame 3 by the movement of second slider section 4b in direction y, whereby lens frame 4 is moved in direction Y, and the position of lens 5 can be adjusted.

That is, first driving device 10 moves lens 5 in direction X, parallel to driving shaft 13, while second driving device 20 moves lens 5 in direction Y, parallel to driving shaft 23.

Further, a moving structure, including first driving device 10, moving frame 3, second driving device 20, and lens frame 4, can move lens 5 along the bottom surface of frame 1.

The position detecting device of lens 5, provided on camera unit 200, will now be detailed.

In FIGS. 3(a) and 3(b), magnet 51, serving as the basic position section, is mounted on a lower surface of ejector member 3c of moving frame 3. Magnet 51 is arranged on the virtual surface, wherein the virtual surface includes the axial line of driving shaft 13 for ejector member 3c of moving frame 3, and is vertically positioned on frame 1 toward driving shaft 13. In this case, magnet 51 is preferably arranged on the axial line of driving shaft 13, or alternately magnet 51 is arranged so that at least a small portion of magnet 51 can be on the virtual surface including the axial line of driving shaft 13.

Magnet sensor 61 is mounted on the bottom surface of frame 1 to face magnet 51, so that magnet sensor 61, serving as the position detecting section, is affected by the magnet force to detect any change of position of magnet 51.

Further, in FIGS. 3(a) and 3(b), magnet 52, serving as another basic position section, is mounted on the lower surface of ejector member 4c of lens frame 4. Magnet 52 is also arranged on a virtual surface, wherein the virtual surface includes the axial line of driving shaft 23 for ejector member 4c of lens frame 4, and is vertically positioned on frame 1 toward driving shaft 23. In this case, magnet 52 is preferably arranged on the axial line of driving shaft 23, or alternately magnet 52 is preferably arranged so that at least a small portion of magnet 52 can be on the virtual surface, including the axial line of driving shaft 23.

Magnet sensor 62 is mounted on the bottom surface of frame 1 to face magnet 52, so that magnet sensor 62, serving as the position detecting section, is affected by the magnet force to detect the change of position of magnet 52.

Magnet sensors 61 and 62, made with a hall element or the like, are sensors which detect magnetism and the magnetic field of magnets 51 and 52, and magnet sensors 61 and 62 convert any detected quantity of magnetism to quantity of electricity, so that the detected magnetic fields of magnets 51 and 52 are outputted as electronic signals.

Still further, when moving frame 3 is driven by first driving device 10 in direction X, which is the horizontal direction in FIG. 3(a), magnet sensor 61 detects any change of position of magnet 51, moving with moving frame 3, in direction X, whereby position detecting device 30 detects relative moving direction and amount of moving frame 3 relative to frame 1, to determine the current position of moving frame 3.

Still further, when lens frame 4 is driven by second driving device 10 in direction Y, which is the vertical direction in FIG. 3(b), magnet sensor 62 detects the change of position of magnet 51 moving with lens frame 4 in direction Y, whereby position detecting device 40 detects relative moving direction and amount of motion of lens frame 4 relative to frame 1, to determine the current position of lens frame 4.

In addition, based on the detected positional changes of magnets 51 and 52, magnet sensors 61 and 62 determine the positions of moving frame 3 and lens frame 4 carrying magnets 51 and 52 respectively, which are well-known technologies, and accordingly, said well-known technologies are not detailed in this specification.

That is, the position of moving frame 3 within frame 1 is detected by moving frame 3 moving in the axial direction of driving shaft 13, magnet 51 mounted on moving frame 3, and magnet sensor 61 to detect the magnetism of magnet 51. Accordingly, position detecting device 30 can be structured to detect the position of lens 5 relative to imaging element 6 within frame 1.

Further, the position of lens frame 3 within frame 1 is detected by lens frame 4 moving in the axial direction of driving shaft 23, magnet 52 mounted on lens frame 3, and magnet sensor 62 to detect the magnetism of magnet 52. Accordingly, position detecting device 40 can be structured to detect the position of lens 5 relative to imaging element 6 within frame 1.

Specifically, magnet 51 of position detecting device 30 is mounted on the virtual surface which is vertically positioned on frame 1 toward driving shaft 13, on moving frame 3 moving in the axial direction of driving shaft 13. Accordingly, position detecting device 30 can detect not only the movement of moving frame 3 moving in direction X along driving shaft 13, but also the position where moving frame 3 has reached.

In detail, since magnet 51 is mounted on ejector member 3c which is formed on the virtual surface including driving shaft 13, and is relatively near driving shaft 13 as the linear distance, the movement of magnet 51 follows nearly the same track as the movement of moving frame 3 moving along driving shaft 13. Accordingly, any movement and position of moving frame 3 can be detected by detection of the movement and position of magnet 51. Further, since the linear distance between driving shaft 13 and ejector member 3c (magnet 51) is relatively less, the movement and position of moving frame 3 can be more correctly detected, when it is compared with the case of the linear distance being relatively greater, because portions of moving frame 3 between driving shaft 13 and ejector member 3c tend to create less distortion.

That is, position detecting device 30 detects the relative position of magnet 51, whereby position detecting device 30 determines the position of lens 5 relative to imaging elements 6 of frame 1.

In the same way as above, magnet 52 of position detecting device 40 is mounted on the virtual surface which is formed perpendicular to frame 1 toward driving shaft 23, on moving frame 4 moving in the axial direction of driving shaft 23. Accordingly, position detecting device 40 can detect not only any movement of lens frame 4 moving in direction Y along driving shaft 23, but also the position where lens frame 4 has reached.

In detail, since magnet 52 is mounted on ejector member 4c which is formed on the virtual surface including driving shaft 23, and is relatively near driving shaft 23 as the linear distance, any movement of magnet 52 follows nearly the same track as the movement of lens frame 4 moving along driving shaft 23. Accordingly, the movement and position of lens frame 4 can be detected by detection of the movement and position of magnet 52. Further, since the linear distance between driving shaft 23 and ejector member 4c (magnet 52) is relatively less, the movement and position of lens frame 4 can be more correctly detected, when it is compared with the case of the linear distance being relatively greater, because portions of lens frame 4 between driving shaft 23 and ejector member 4c tend to create less distortion.

That is, position detecting device 40 detects the relative position of magnet 52, whereby position detecting device 30 determines the position of lens 5 relative to imaging elements 6 of frame 1.

By the above described structure of camera unit 200, first driving device 10 and second driving device 20 drive lens 5 of camera unit 200, in the two directions, each bisecting at right angles. That is, first driving device 10 and second driving device 20 work together to drive lens 5 of camera unit 200 in the optimal direction so that the image of the target subject can be better guided onto imaging element 6. Accordingly, even when the user shakes cellular phone 100 (being a camera), lens 5 in camera unit 200 is moved to counter any shaking, so that any camera shake is corrected while photographing.

Specifically, since camera unit 200 incorporates position detecting device 30 and position detecting device 40 to correctly detect the position of lens 5 relative to frame 1 (imaging element 6), any camera shake can be more effectively countered.

In addition, since the operation and the process of the camera shake correction, conducted by not only first driving device 10 and second driving device 20 to move lens 5, but also position detecting device 30 and position detecting device 40, are the same as conventional technology, they are not detailed.

As described above, since camera unit 200 incorporates position detecting device 30 and position detecting device 40, relating to the present invention, the position of lens 5, being a target object, is correctly detected, so that any camera shake is more effectively compensated.

Further, based on the function of camera unit 200, which can detect the position of lens 5 as the target object, and more effectively counter any camera shake, when cellular phone 100, incorporating camera unit 200, is used for photographing, the position of lens 5 can be correctly detected, so that any camera shake can be compensated.

In addition, the present invention is not limited to the above example.

Figure 4:
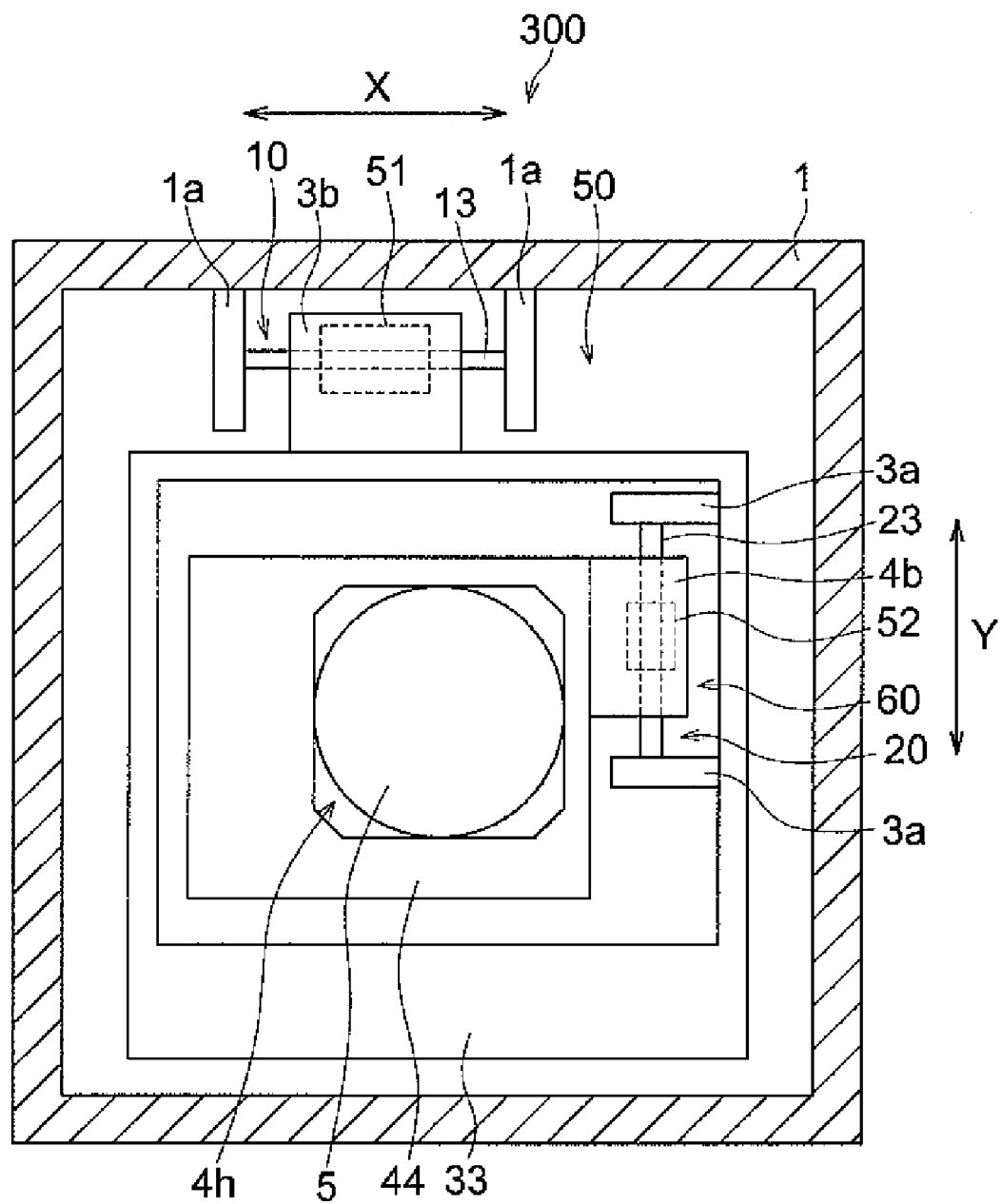
FIG. 4 is a cross sectional view of a variation of the camera unit of the present invention.

For example, camera unit 300, shown in FIG. 4 is able to obtain the same effect as camera unit 200. However, camera unit 300 does not include ejector member 3c on moving frame 3, nor ejector member 4c on lens frame 4, both of which exist in camera unit 200.

In camera unit 300 shown in FIG. 4, magnet 51 is mounted on the lower surface of first slider section 3b of moving frame 3c, and magnet sensor 61 is mounted on the bottom surface of frame 1 to face magnet 51.

Further, position detecting device 50, relating to the present invention, is formed of magnet 51 mounted on first slider section 3b, being an engaging section to engage driving shaft 13, and magnet sensor 61, mounted on frame 1, to detect the magnetism of magnet 51.

That is, position detecting device 50 detects the current position of lens 5 relative to imaging element 6 of frame 1, in which the position of moving frame 3c relative to frame 1 is detected by moving frame 3c moving in the axial direction of driving shaft 13 relative to frame 1, magnet 51 mounted on moving frame 3c, and magnet sensor 61 to detect the magnetism of magnet 51.

Still further, magnet 52 is mounted on the lower surface of second slider section 4b of lens frame 44 of camera unit 300, and magnet sensor 62 is mounted on the bottom surface of frame 1, to face said magnet 52.

Still further, position detecting device 60 relating to the present invention is formed of magnet 52 mounted on second slider section 4b being an engaging section to engage driving shaft 23, and magnet sensor 62, mounted on frame 1, to detect the magnetism of magnet 52.

That is, position detecting device 60 determines the position of lens 5 relative to imaging element 6 of frame 1, because the position of lens frame 44 relative to frame 1 is detected by lens frame 44 moving in the axial direction of driving shaft 23 relative to frame 1, magnet 52 mounted on lens frame 44, and magnet sensor 62 to detect the magnetism of magnet 52.

Specifically, since magnet 51 of position detecting device 50 is mounted on first slider section 3b, existing on the virtual surface including the axial line of driving shaft 13, clearance or linear distance between driving shaft 13 and magnet 51 becomes relatively less, so that less distortion is formed between driving shaft 13 and magnet 51. Accordingly, position detecting device 50 can move moving frame 3 in direction X along driving shaft 13, and can more correctly determine the position where moving frame 3 has reached.

In a similar way, since magnet 52 of position detecting device 60 is mounted on second slider section 4b, existing on the virtual surface including the axial line of driving shaft 23, any clearance or linear distance between driving shaft 23 and magnet 52 becomes relatively less, so that less distortion is formed between driving shaft 23 and magnet 52. Accordingly, position detecting device 60 can move lens frame 4 in direction X along driving shaft 23, and can more correctly determine the position where lens frame 4 has reached.

Further, on position detecting device 50, since ejector member 3c (see FIG. 3) of moving frame 3 of camera unit 200 is omitted in FIG. 4, lens frame 44 is downsized so that larger spaces can be secured in frame 1, which helps arrangement of new structures and members, and more advanced arrangement of existing structures and members.

In the above embodiments, cellular phone 100 is detailed as the electronic device having camera unit 200 or 300, however the present invention is not limited to said cellular phone 100, and the present invention will be applicable onto various electronic devices, such as mobile devices of a PDA or the like.

Further, in the above embodiments, the piezoelectric element is detailed as the electromechanical transducer element, however the present invention is not limited to the piezoelectric element. For example, an electrostrictive element can also be used, which element elongates and contracts due to applied electric voltage.

Still further, detailed structures can, of course, be changed.

Based on the present invention, the movable section is provided which moves in an axial direction of the predetermined axial section, and detects the position of the movable section relative to a supporting section which movably supports the movable section, a basic position section is provided on the movable section, arranged on a virtual surface which includes an axial line of the axis section, and is vertically positioned on the supporting section toward the axial section, and the position detecting section to detect the positional change of the basic position section is provided on the supporting section, wherein the position detecting device more correctly detects the current position of the movable section relative to the supporting section, and the position of attached fittings arranged on the movable section.

That is, since the basic position section of the position detecting device is provided on the virtual surface including the axial line of the axial section, the clearance and the linear distance between the axial section and the basic position section become less, and thereby less distortion is created between them.

Accordingly, the position detecting device can more correctly detect the position of the movable section moving in the axial direction along the axial direction, and the positions of the predetermined objects, such as attached fittings mounted on the movable section.

Further, concerning the electronic devices incorporating said position detecting device, the position of target object can be more effectively determined.

What is claimed is:

1. A position detecting device, comprising:
a movable section which has an axial section and moves in a direction of an axial line of the axial section; and
a supporting section which supports the movable section and allows the movable section to move through the axial section;
wherein the movable section includes a basic position section which is arranged on an extension of the axial line of the axial section,
wherein the supporting section includes a position detecting section to detect a positional change of the basic position section; and
wherein the position detecting device detects the position of the movable section relative to the supporting section, based on the positional change of the basic position section, detected by the position detecting section.

2. The position detecting device of claim 1,
wherein the movable section further includes an engaging section to engage the axial section, and
wherein the basic position section is mounted on the extension of the axial line of the axial section on the engaging section.

3. The position detecting device of claim 1,
wherein an imaging element on which an image of a subject is concentrated, is mounted on the supporting section, and
wherein an optical member to guide the image of the subject to the imaging element is provided on the movable section.

4. The position detecting device of claim 1,
wherein the basic position section comprises a magnet, and wherein the position detecting section comprises a magnet sensor to detect magnetism of the magnet.

5. An electronic device, including the position detecting device of claim 1.

* * * * *